(12) United States Patent
Li et al.

(10) Patent No.: US 10,781,142 B2
(45) Date of Patent: Sep. 22, 2020

(54) METHOD OF FORMING GRAPHENE/METAL-OXIDE HYBRID REINFORCED COMPOSITES AND PRODUCT THEREOF

(71) Applicant: UNIVERSITY OF VIRGINIA PATENT FOUNDATION, Charlottesville, VA (US)

(72) Inventors: Xiaodong Li, Charlottesville, VA (US); Yunya Zhang, Charlottesville, VA (US)

(73) Assignee: UNIVERSITY OF VIRGINIA PATENT FOUNDATION, Charlottesville, VA (US)

(*) Notice: Subject to any disclaimer, the term of this patent is extended or adjusted under 35 U.S.C. 154(b) by 0 days.

(21) Appl. No.: 15/753,866

(22) PCT Filed: Aug. 19, 2016

(86) PCT No.: PCT/US2016/047714
§ 371 (c)(1),
(2) Date: Feb. 20, 2018

(87) PCT Pub. No.: WO2017/031403
PCT Pub. Date: Feb. 23, 2017

(65) Prior Publication Data
US 2018/0244582 A1 Aug. 30, 2018

Related U.S. Application Data

(60) Provisional application No. 62/207,700, filed on Aug. 20, 2015.

(51) Int. Cl.
*C04B 35/01* (2006.01)
*C04B 35/80* (2006.01)
(Continued)

(52) U.S. Cl.
CPC ............ *C04B 35/806* (2013.01); *C04B 35/01* (2013.01); *C04B 35/117* (2013.01);
(Continued)

(58) Field of Classification Search
CPC ... C04B 35/806; C04B 35/528; C04B 35/628; C04B 35/64; C04B 35/62655;
(Continued)

(56) References Cited

U.S. PATENT DOCUMENTS

2009/0092747 A1* 4/2009 Zhamu .................. H01G 9/058
427/80
2010/0081057 A1 4/2010 Liu et al.
(Continued)

FOREIGN PATENT DOCUMENTS

CN 102329976 A * 1/2012 ............. C22C 1/05
CN 102329976 A 1/2012
(Continued)

OTHER PUBLICATIONS

International Search Report dated Oct. 24, 2016, issued in counterpart application No. PCT/US2016/047714 (1 pages).
(Continued)

*Primary Examiner* — Noah S Wiese
(74) *Attorney, Agent, or Firm* — Westerman, Hattori, Daniels & Adrian, LLP

(57) ABSTRACT

A graphene/metal-oxide hybrid reinforced composite and a method for a graphene/metal-oxide hybrid reinforced composite. The method includes freeze drying a slurry comprising graphene oxide and flakes to form a flake-graphene oxide foam. The graphene/metal-oxide hybrid reinforced composite comprises graphene, metal, and metal oxide nanoparticles. The metal is arranged in parallel lamellar structure to form metal layers in the composite. The metal
(Continued)

oxide nanoparticles are present at the interfaces between the metal layers and the graphene.

18 Claims, 17 Drawing Sheets

(51) Int. Cl.
| | | |
|---|---|---|
| C04B 35/528 | (2006.01) | |
| C04B 35/622 | (2006.01) | |
| C04B 35/634 | (2006.01) | |
| C04B 35/117 | (2006.01) | |
| C04B 35/626 | (2006.01) | |
| C04B 35/628 | (2006.01) | |
| C04B 35/64 | (2006.01) | |
| C04B 35/76 | (2006.01) | |
| C22C 1/08 | (2006.01) | |
| C22C 1/10 | (2006.01) | |
| C22C 26/00 | (2006.01) | |

(52) U.S. Cl.
CPC .......... *C04B 35/528* (2013.01); *C04B 35/622* (2013.01); *C04B 35/628* (2013.01); *C04B 35/6265* (2013.01); *C04B 35/62655* (2013.01); *C04B 35/634* (2013.01); *C04B 35/63416* (2013.01); *C04B 35/64* (2013.01); *C04B 35/76* (2013.01); *C22C 1/08* (2013.01); *C22C 1/1026* (2013.01); *C22C 26/00* (2013.01); *B22F 2999/00* (2013.01); *C04B 2235/422* (2013.01); *C04B 2235/5276* (2013.01); *C04B 2235/5292* (2013.01); *C04B 2235/5454* (2013.01); *C04B 2235/781* (2013.01); *C04B 2235/788* (2013.01)

(58) Field of Classification Search
CPC ..... C04B 35/76; C04B 35/634; C04B 35/622; C04B 35/117; C04B 2235/5276; C04B 2235/5454; C04B 2235/781; C04B 2235/788; C04B 2235/422; C22C 1/08; C22C 1/1026; C22C 26/00
See application file for complete search history.

(56) References Cited

U.S. PATENT DOCUMENTS

| | | | |
|---|---|---|---|
| 2014/0378294 | A1 | 12/2014 | Corral et al. |
| 2016/0332136 | A1* | 11/2016 | Zhang .................... C02F 1/281 |

FOREIGN PATENT DOCUMENTS

| | | | | |
|---|---|---|---|---|
| WO | 2015/109272 A1 | 7/2015 | | |
| WO | 2015/112088 A2 | 7/2015 | | |
| WO | WO-2015112088 A2 * | 7/2015 | ............. B01J 20/02 |

OTHER PUBLICATIONS

International Preliminary Report on Patentability (Form PCT/IB/326) issued in counterpart International Application No. PCT/US2016/047714 dated Mar. 1, 2018, with Form PCT/IB/373 and PCT/ISA/237 (10 pages).

Jamaati, Roohollah et al., "Manufacturing of High-Strength Aluminum/Alumina Composite by Accumulative Roll Bonding", Materials Science and Engineering A 527, 2010, pp. 4146-4151.

Ritchie, Robert O., "The Conflicts Between Strength and Toughness", Nature Materials, vol. 10, Nov. 11, pp. 817-822.

Stankovich, Sasha et al., "Graphene-Based Composite Materials", Nature, vol. 442, No. 20, Jul. 2006, pp. 282-286.

Chawla, N. et al., "Microstructure and Mechanical Behavior of Porous Sintered Steels", Materials Science and Engineering A 390, 2005, pp. 98-112.

"Standard Test Methods for Tension Testing of Metallic Materials", ASTM International, Designation: E8/E8M 13a, 28 pages.

Lee, C. G., Wei, X. D., Kysar, J. W. and Hone, J. Measurement of the Elastic Properties and Intrinsic Strength of Monolayer Graphene. Science 321, 385-388 (2008).

Rashad, M., Pan, F., Tang, A. and Asif, M., Effect of Graphene Nanoplatelets Addition on Mechanical Properties of Pure Aluminum Using a Semi-Powder Method, Science Direct, Progress in Natural Science: Materials International 24 101-108 (2014).

* cited by examiner

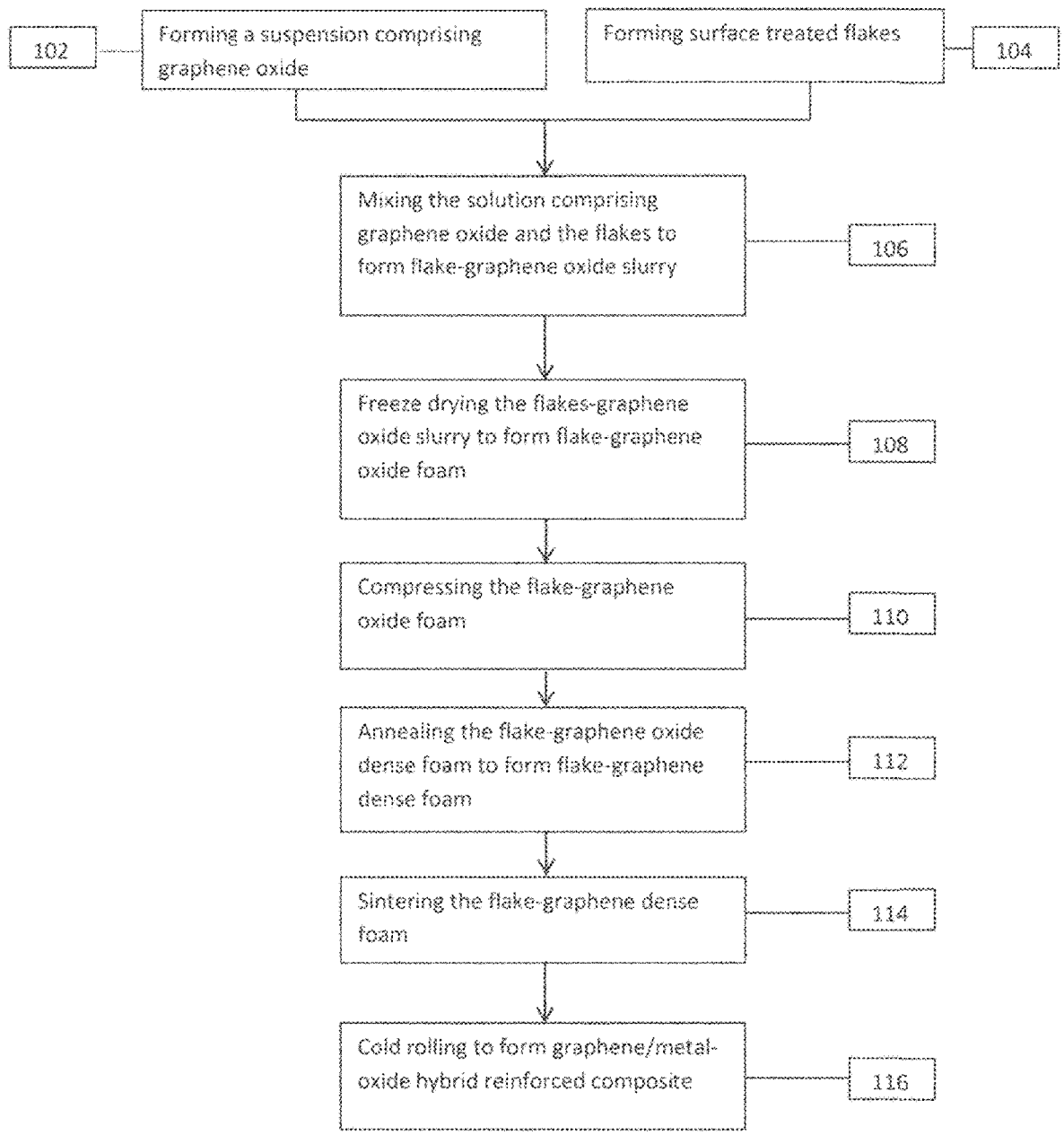
Figure 1(A): A flow chart of a process for forming a graphene/metal-oxide hybrid reinforced composite.

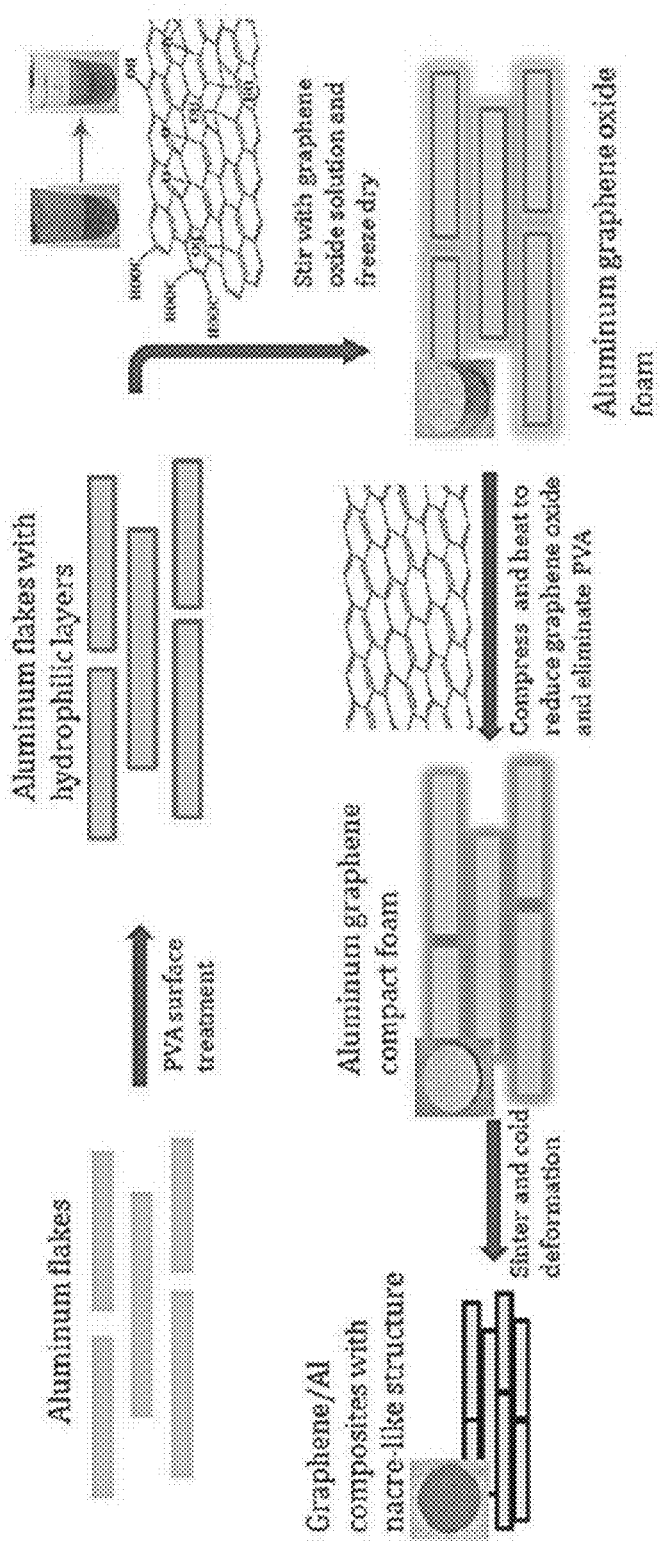
Figure 1 (B): Illustration of the fabrication process for a graphene/alumina hybrid reinforced aluminum composite.

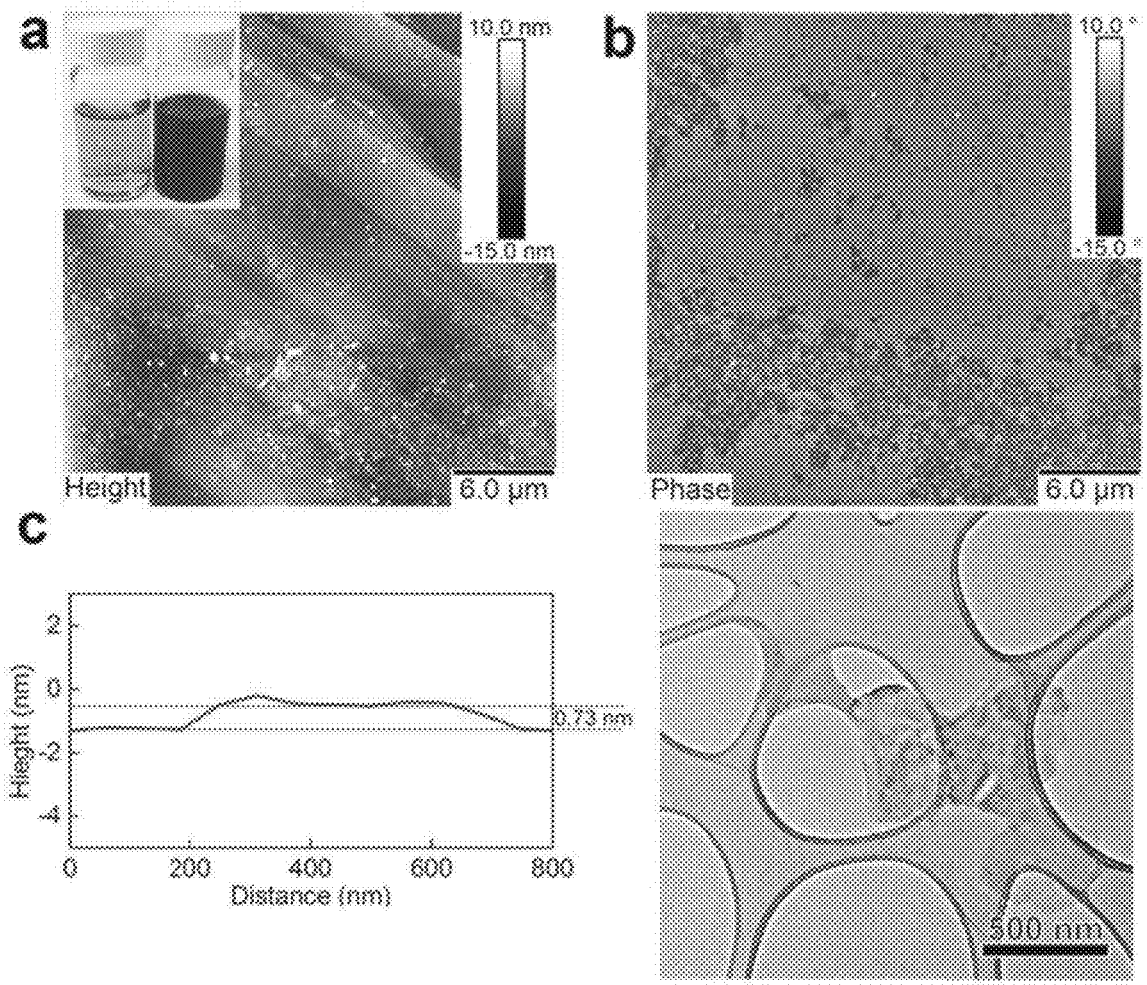

Figure 2: AFM and TEM images of graphene oxide (GO) sheets produced by Hummers method. a, Height profile of GO sheets dispersed on HOPG. Inset: photographs of GO suspension with concentration of 0.1 mg/mL (golden brown) and 5 mg/mL (dark brown). b, Corresponding phase image. c, Height distribution of a GO sheet, showing height of 0.73 nm. d, TEM image of GO sheets, showing transparency and flexibility.

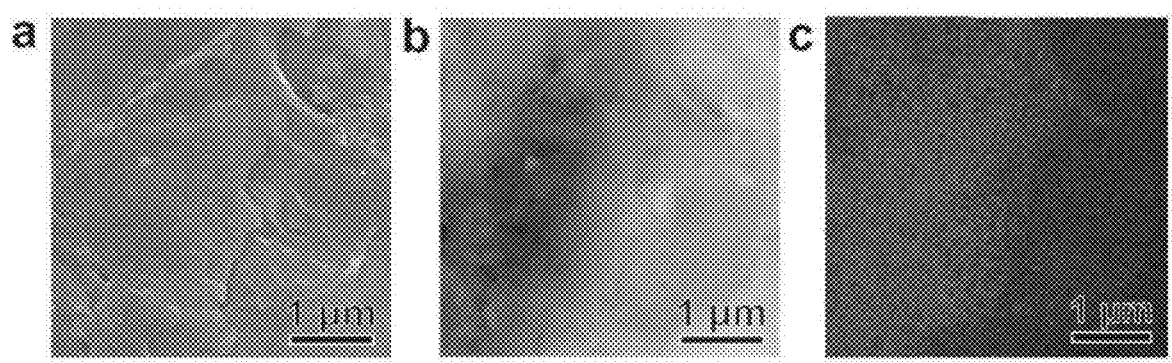
Figure 3: The combination of aluminum flakes and reduced GO sheets. a, SEM image of Al flake after stirring with graphene oxide and heating at 550 °C. b, Corresponding backscattered electron image c, EDS carbon map.

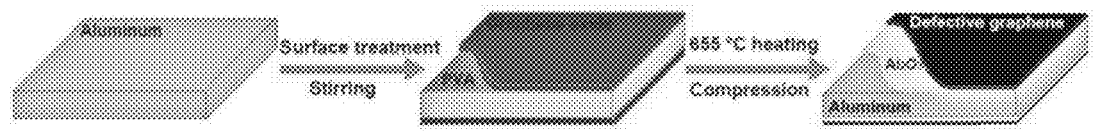
Figure 4: Schematic diagram of the formation of Al/Al$_2$O$_3$/defective graphene/Al$_2$O$_3$/Al multi-layered structure.

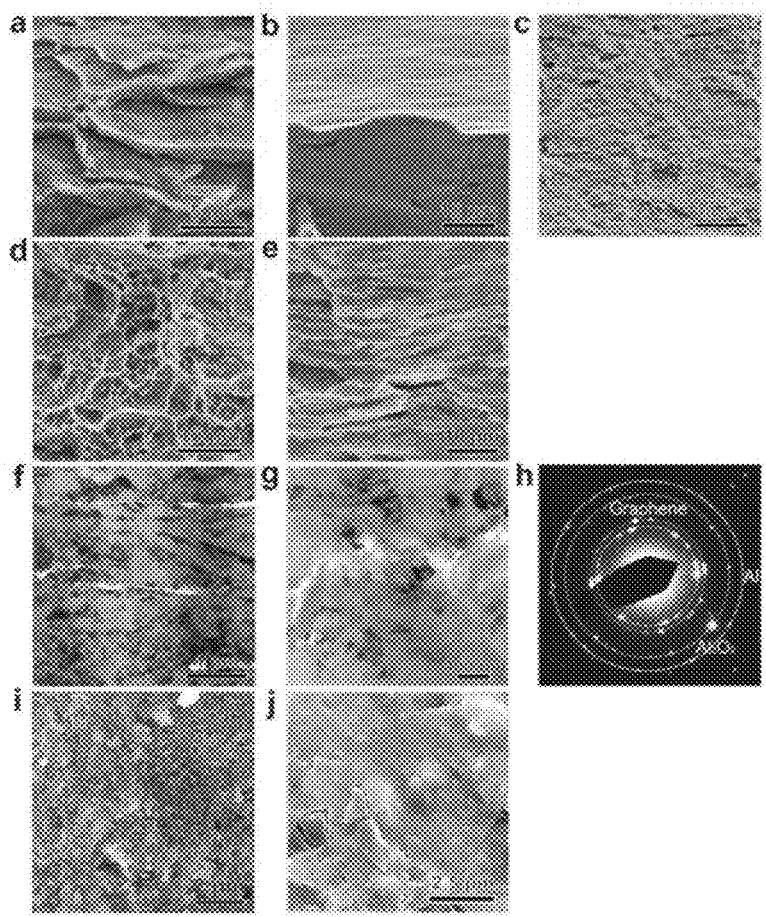

Figure 5: Microstructure and fracture surfaces of graphene/alumina hybrid reinforced aluminum composite and control groups. a, A nacre-like laminated structure of graphene/alumina hybrid reinforced aluminum composite, showing nanoscale asperities on interfaces. b, Fracture surface of pure aluminum sample. c, Fracture surface of Al semi powder metallurgy sample (without GO). d, Fracture surface of Al/graphene mix sample (without PVA surface treatment and freeze dry). e, Fracture surface of Al/graphene composite produced by shear mix method, showing a laminated structure without nanoscale asperities. f, TEM image of graphene/alumina hybrid reinforced aluminum composite sample, showing aluminum layers and nano particle bands. g, Higher magnification TEM image indicated that nano particles had a quasi-rectangular shape. h, The corresponding SAED pattern of (h). i, SEM image of peeled Al/graphene/alumina composite, showing rod-like nano particles. j, The peeled surface of the Al/graphene composite produced by shear mix method, showing no nano asperities.

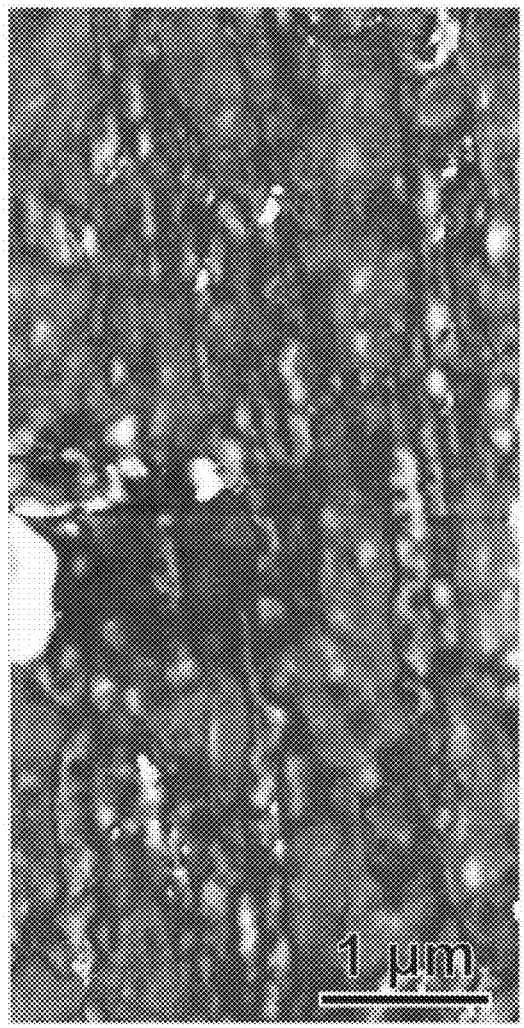
Figure 6: AFM phase image of graphene/alumina hybrid reinforced aluminum composite, showing laminated structure.

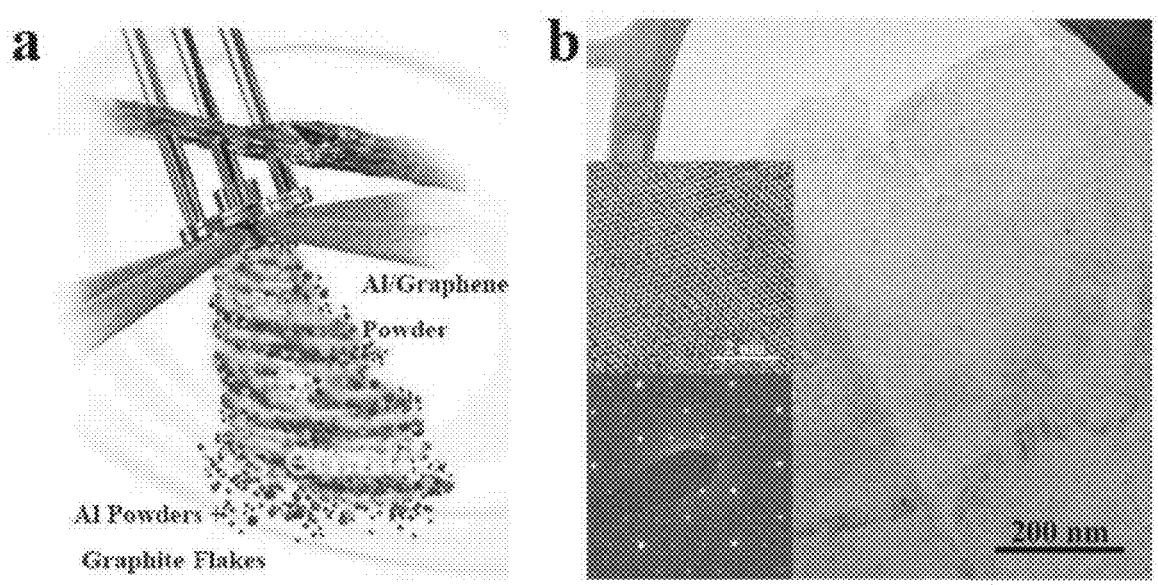
Figure 7: Al/graphene composite produced by shear mix. a, A sketch of producing Al/graphene composite by shear mix method. Graphite flakes were shear mixed 10 min at 4500 rpm, and then aluminum powders were added gradually to get Al/graphene powders. b, HRTEM and SAED pattern of graphene produced by shear mix method, showing nearly perfect crystal structure.

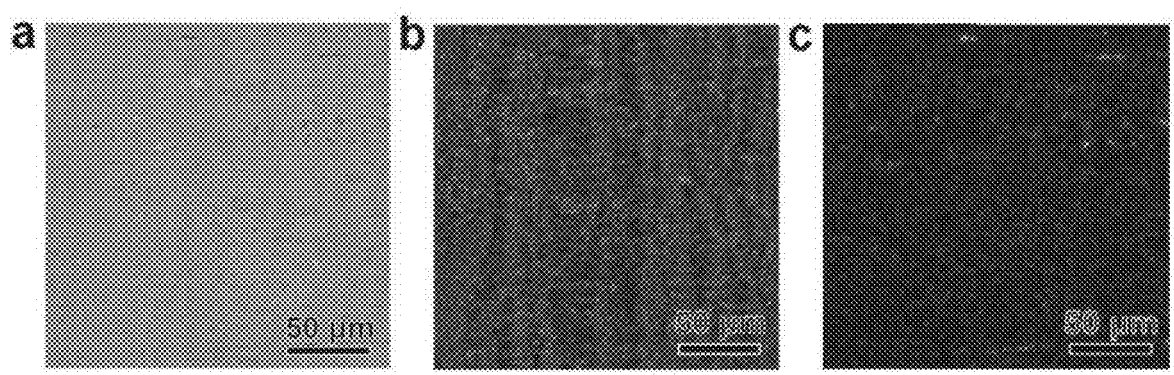
Figure 8: SEM image and EDS maps of polished transverse section of graphene/alumina hybrid reinforced aluminum composite. a, Backscattered electron image. b, Corresponding EDS oxygen map. c, EDS carbon map.

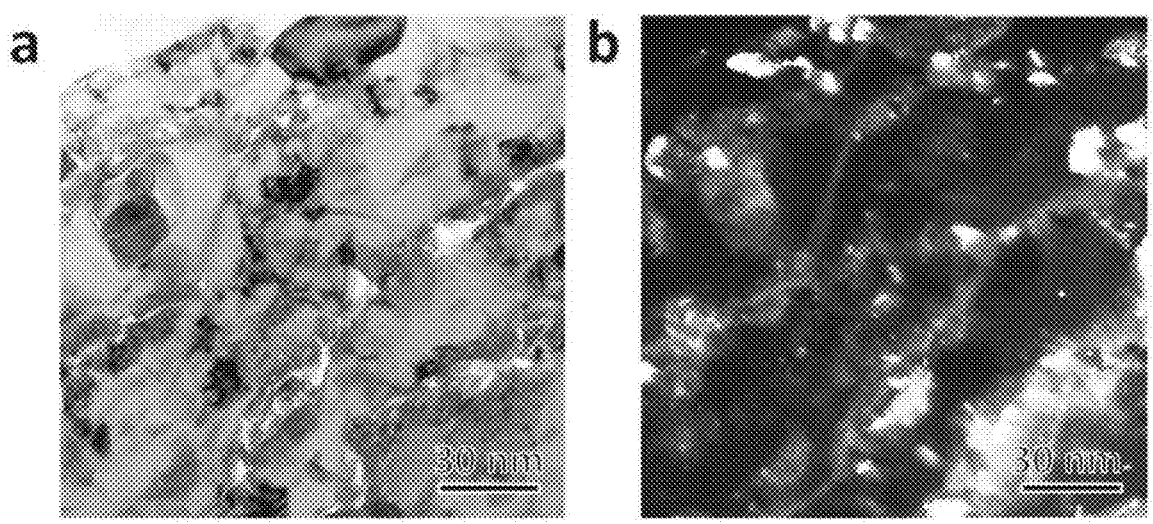
Figure 9: Dark field TEM image of the graphene/alumina hybrid reinforced aluminum composite. a, Bright field image. b, Dark field image, brighter parts are alumina nanoparticles.

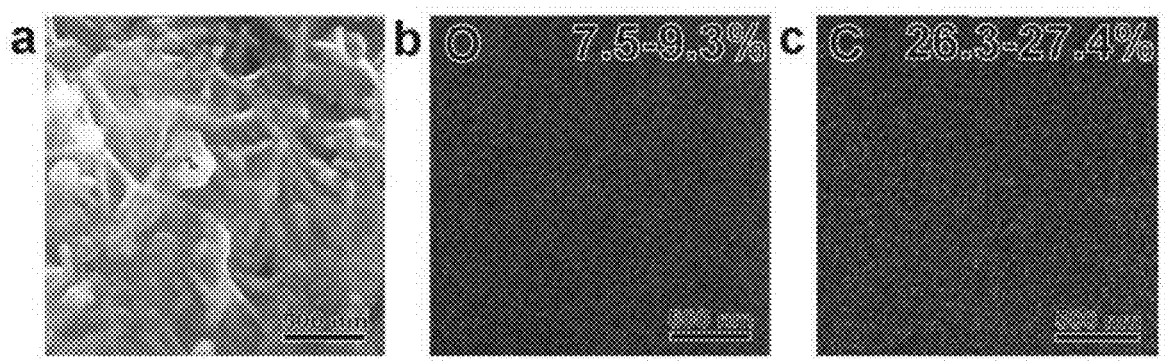

Figure 10: SEM images and EDS maps of a peeled graphene/alumina hybrid reinforced aluminum composite layer. a, SEM image of the sample, showing nano asperities with round and rod-like morphologies. Pins indicate locations where point EDS analyses were carried out. b, Oxygen map and the range of oxygen content at five points. c, Carbon map and the range of carbon content of five points.

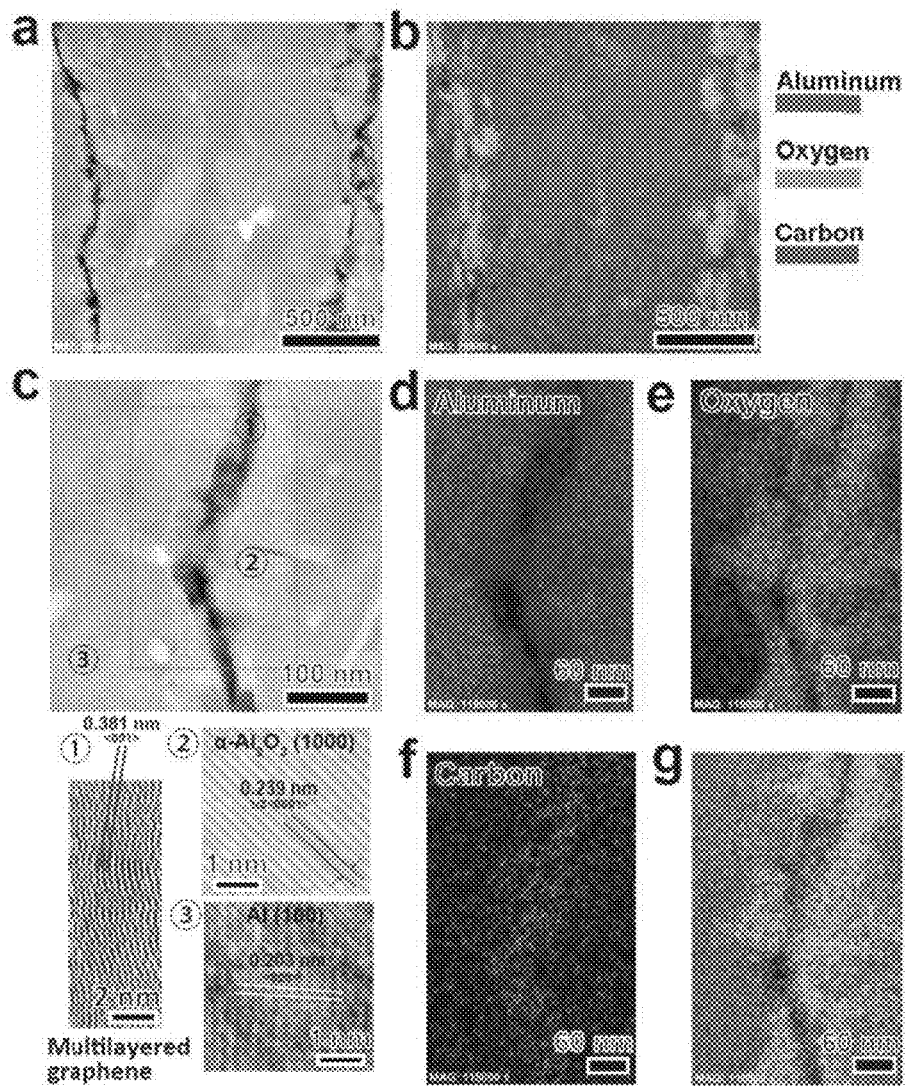

Figure 11: STEM and atomic resolution EDS images of the graphene/alumina hybrid reinforced aluminum composite. a, STEM image of graphene/alumina hybrid reinforced aluminum composite. b, Corresponding EDS map of (a), indicating that the interfaces were rich in oxygen and carbon. c, Close-up STEM image of the interface with three HRTEM images suggests that multilayered graphene embedded in α-Al$_2$O$_3$ on the interface and beyond the interface was aluminum. d, EDS maps of aluminum e, oxygen f, carbon and g, overlapped map shows that a layer of carbon separated the aluminum layers and Al$_2$O$_3$ bands generated between carbon and aluminum.

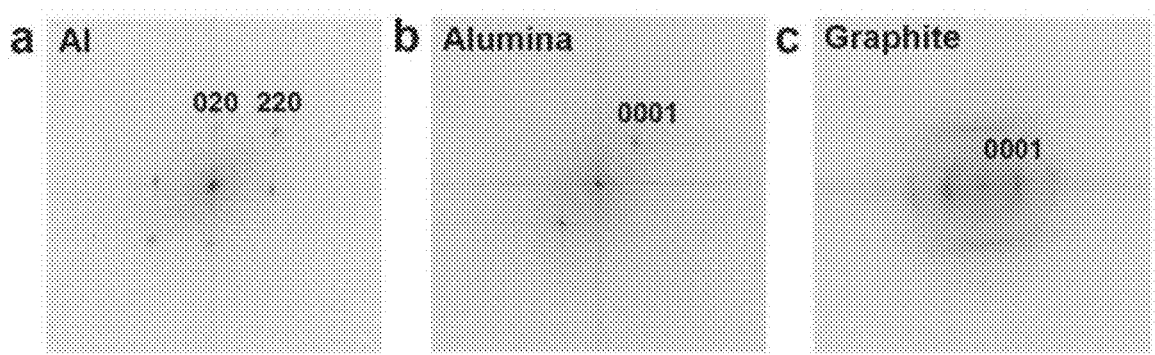
Figure 12: FFT patterns of HRTEM images in Fig. 2c. a, Aluminum matrix. b, Al$_2$O$_3$ nano asperities. c, Multilayered graphene

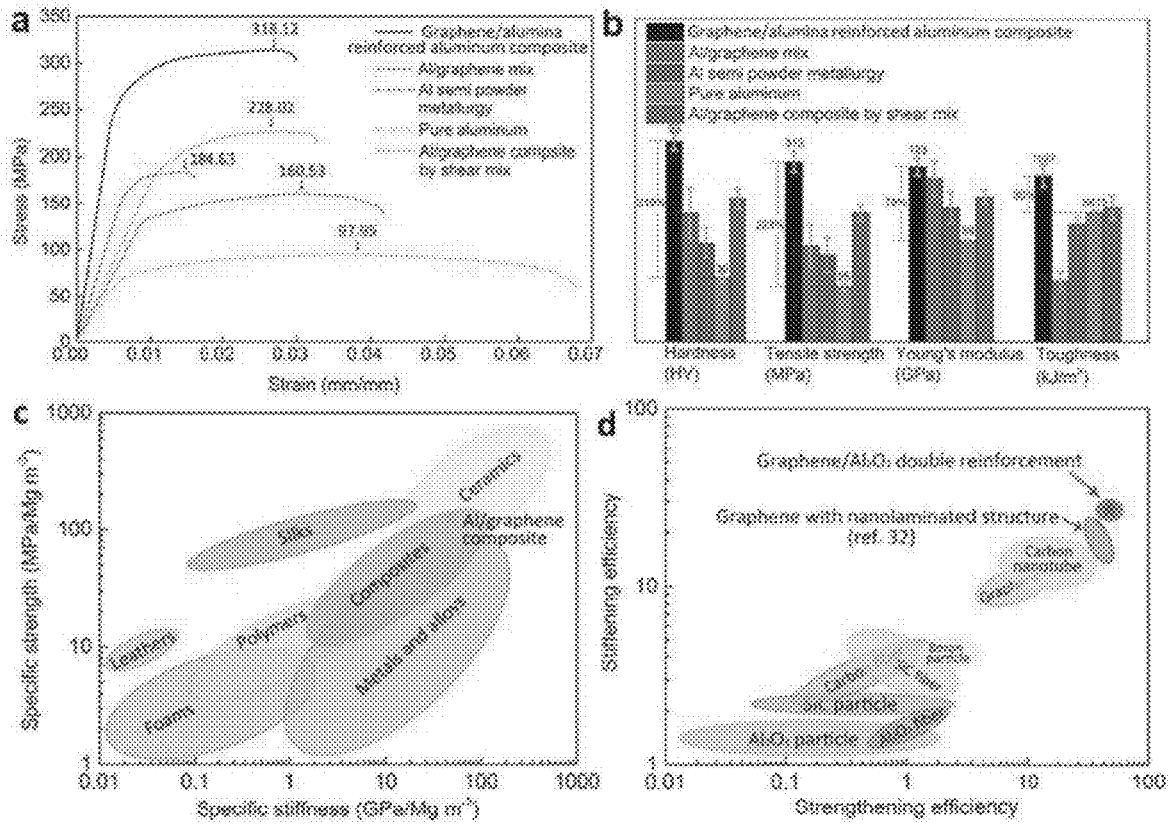

Figure 13: Mechanical properties of graphene/alumina hybrid reinforced aluminum composite, Al/graphene mix, Al semi powder metallurgy, pure aluminum samples, and Al/graphene composite by shear mix samples. a, Comparative tensile test curves. b, Comparative bar chart of hardness, tensile strength, Young's modulus, and fracture toughness. c, Ashby plot of the specific values (that is, normalized by density) of strength and stiffness (or Young's modulus). d, Comparison of the strengthening and stiffening efficiencies of graphene/alumina hybrid reinforced aluminum composite with various reinforcements in Al matrix composites.

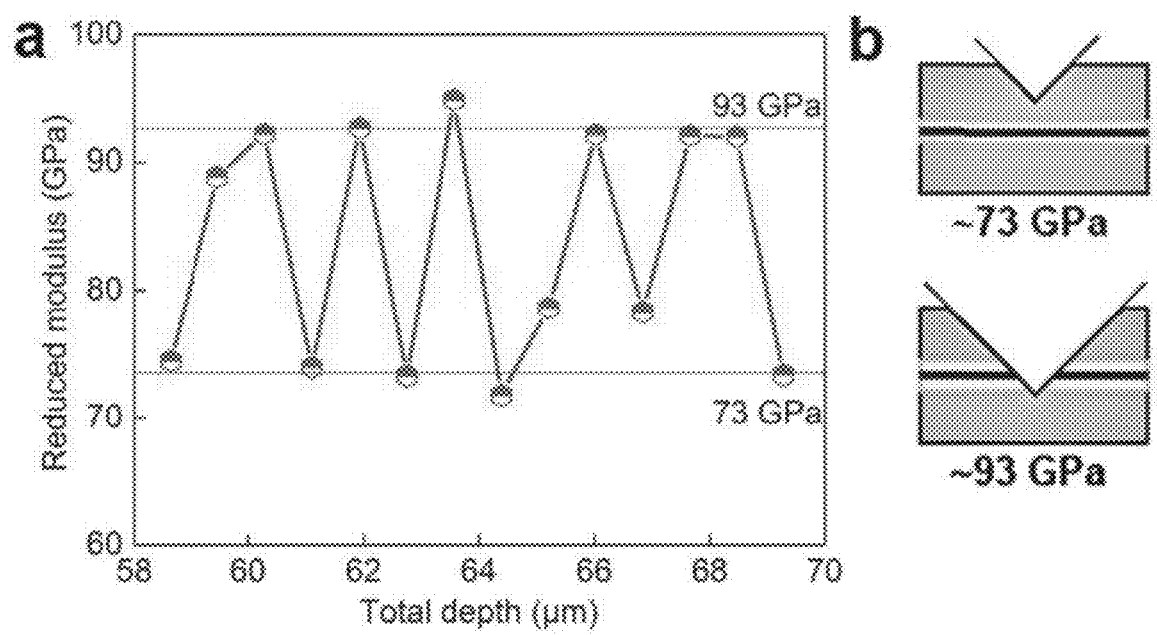
Figure 14: Nano indentation of graphene/alumina hybrid reinforced aluminum composite. a, The total depth-reduced modulus plot, showing an ordered oscillation of modulus. b, Schematic diagram of the nano indentation process.

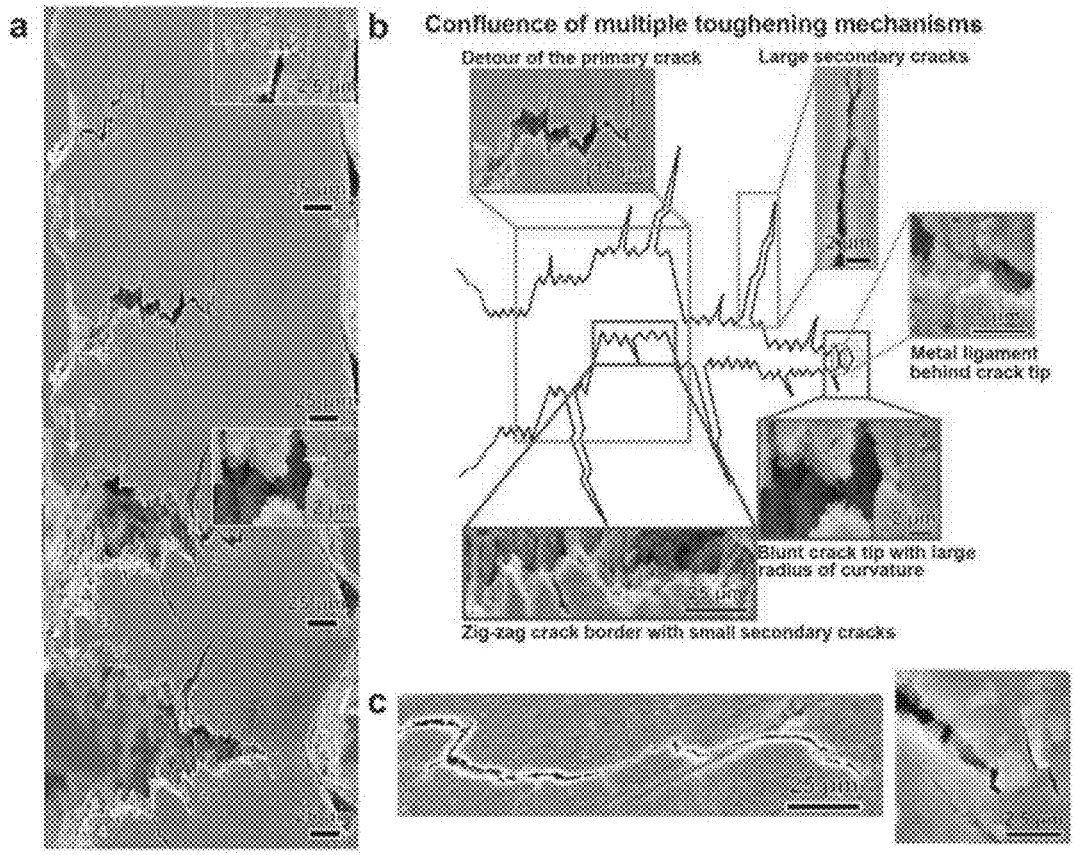

Figure 15: In-situ three-point bending test of a graphene/alumina hybrid reinforced aluminum composite sample in SEM. a, SEM images of the crack under various degrees of deformation. (Yellow arrows indicate the status of bending and white arrows indicate the primary crack propagation direction). b, The crack propagation of graphene/alumina hybrid reinforced aluminum composite sample exhibited a confluence of multiple toughening mechanisms. The primary crack was detoured into a serpentine morphology. Along with the primary crack, several large secondary cracks were stimulated and propagated parallel to the lamellae. The tip of the primary crack was blunt with large radius of curvature. The border of the primary crack displayed zig-zag shape with small secondary cracks. Metal bridges formed behind the crack tip. c, The crack propagation of an Al/graphene mix sample.

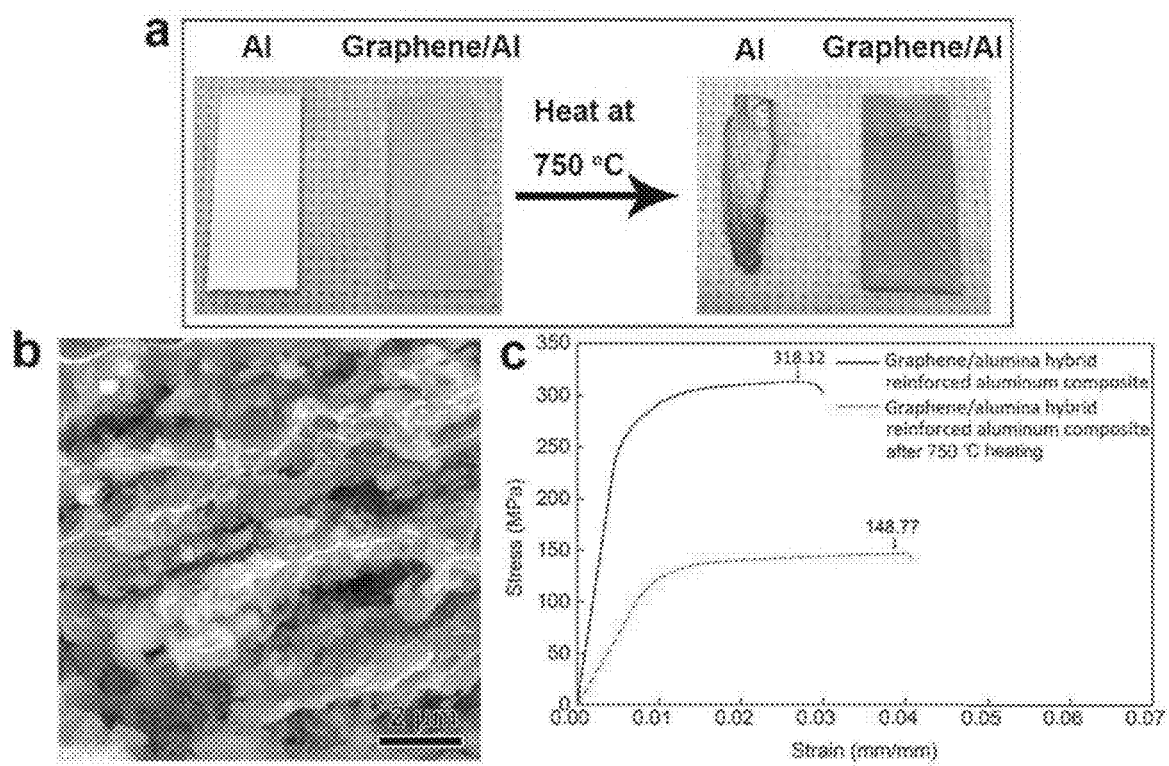

Figure 16: Graphene/alumina hybrid reinforced aluminum composite sample after high temperature heating. a. A piece of graphene/alumina hybrid reinforced aluminum composite was able to maintain the shape after heating at 750 °C, while a piece of pure aluminum could not. b. After high temperature heating, laminated structures were preserved and nanoscale asperities became thicker. c. The sample has strength of 148.77 MPa after high temperature heating.

METHOD OF FORMING GRAPHENE/METAL-OXIDE HYBRID REINFORCED COMPOSITES AND PRODUCT THEREOF

CROSS-REFERENCE TO RELATED APPLICATIONS

This application claims the benefit of the filing date of U.S. Provisional Patent Application No. 62/207,700 filed on Aug. 20, 2015, the disclosure of which is hereby incorporated by reference.

GOVERNMENT INTEREST STATEMENT

This invention was made with government support under Grant Nos. 1418696 and 1537021, awarded by the National Science Foundation. The government has certain rights in the invention.

FIELD OF THE INVENTION

This invention relates to graphene/metal-oxide hybrid reinforced composites, and more particularly, to a method for forming graphene/metal-oxide hybrid reinforced composites and the products thereof.

BACKGROUND OF THE INVENTION

Metal composites such as aluminum composites have attracted huge attention because of their potential applications in automotive, aerospace, electronics, and many other industries. The reasons for their popularity as the most favorable candidate materials are their superior mechanical properties and impressive property-to-weight ratio in comparison to monolithic metal alloys such as aluminum alloys. However, it has been challenging to simultaneously achieve high strength and toughness in metal composites because of the trade-off relation between the two distinct properties.

Graphene, as the strongest two dimensional (2D) material ever discovered, is known to have a Young's modulus of 1 TPa and intrinsic strength of 130 GPa. Such values are 5 and 20 times greater than those for steel, respectively, at just ⅓ of the weight. Thus, graphene sheets are expected to serve as mechanical reinforcements for lightweight composite systems.

Due to ultra-high hardness and outstanding chemical stability, alumina has long been considered as an ideal component to composite with metals and thereby motivated research on alumina/metal composites. Homogeneous dispersion of alumina particles was thought to be the main challenge so that various fabrication methods had been adopted to improve the uniformity, such as hot rolling, friction stirring, and DC plasma process. Gradually, it has been realized that orderly arranged alumina particles could lead to better mechanical performance. R. Jamaati et. Al. [Jamaati, R. & Toroghinejad, M. R., *Mater. Sci. Eng. A* 527, 4146-4151(1020)] used accumulative roll bonding process and produced ordered alumina particle bands in an aluminum plate, obtaining superior strength.

BRIEF SUMMARY

Accordingly, one example of the present invention is a process for forming graphene/metal-oxide hybrid reinforced composites. The process comprises freeze drying a slurry comprising graphene oxide (GO) and flakes to form a flake-GO foam. The flakes may be metal flakes or ceramic flakes. The process may start with low-cost industrial graphite powders and flakes such as metal flakes, followed by coupled sintering and cold rolling processes, thus enabling mass production of large-sized structures with a high fraction of graphene.

Accordingly, another example of the present invention is a graphene/metal-oxide hybrid reinforced composite. The composite comprises graphene, metal, and metal oxide nanoparticles. The metal is arranged in parallel lamellar structure in the composite to form metal layers. The metal-oxide nanoparticles are present at the interfaces between the metal layers and the graphene. In one embodiment, the metal is aluminum, and the metal-oxide nanoparticles are alumina nanoparticles. Compared with pure aluminum, the 2 wt. % graphene/alumina hybrid reinforced aluminum composite of the present invention exhibits an exceptional, joint improvement in mechanical properties, 173% increase in hardness, 208% enhancement in strength, 207% amplification in Young's modulus, and 30% improvement in toughness. In addition, such fabricated composite has a lower density (2.65 g/cm$^3$) and a superior high temperature resistance (750° C.) in comparison to pure aluminum.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 1(A) shows a flow chart of the process for forming graphene/metal-oxide hybrid reinforced composites in accordance with one embodiment of the present invention.

FIG. 1(B) shows an illustration of the fabrication process for graphene/alumina hybrid reinforced aluminum composite in accordance with one embodiment of the present invention.

FIG. 2 shows atomic force microscopy (AFM) and transmission electron microscopy (TEM) images of graphene oxide (GO) flakes produced by Hummers method in accordance with one embodiment of the present invention. a, Height profile of GO sheets dispersed on highly oriented pyrolytic graphite (HOPG). Inset: photographs of GO suspension with concentration of 0.1 mg/mL (golden brown) and 5 mg/mL (dark brown). b, Corresponding phase image. c, Height distribution of a GO sheet, showing a height of 0.73 nm. d, TEM image of GO flakes, showing transparency and flexibility.

FIG. 3 shows the combination of aluminum flakes and reduced GO in accordance with one embodiment of the present invention. a, Scanning electron microscopy (SEM) image of Al flake after stirring with GO and heating at 550° C. b, Corresponding backscattered electron image c, Energy-dispersive X-ray spectroscopy (EDS) carbon map.

FIG. 4 shows a schematic diagram of the formation of Al/Al$_2$O$_3$/defective graphene/Al$_2$O$_3$/Al multi-layered structure.

FIG. 5 shows microstructure and fracture surfaces of graphene/alumina hybrid reinforced aluminum composite and control groups. a, A nacre-like laminated structure of graphene/alumina hybrid reinforced aluminum composite, showing nanoscale asperities on interfaces. b, Fracture surface of pure aluminum sample. c, Fracture surface of Al semi powder metallurgy sample (without GO). d, Fracture surface of Al/graphene mix sample (without polyvinyl alcohol (PVA) surface treatment and freeze dry). e, Fracture surface of Al/graphene composite produced by shear mix method, showing a laminated structure without nanoscale asperities. f, TEM image of graphene/alumina hybrid reinforced aluminum composite sample, showing aluminum layers and nano particle bands. g, Higher magnification TEM image indicated that nano particles had a quasi-rectangular shape. h, The corresponding selected area diffraction (SAED) pattern of (h). i, SEM image of peeled graphene/alumina hybrid reinforced aluminum composite, showing rod-like nano particles. j, The peeled surface of the Al/graphene composite produced by shear mix method, showing no nano asperities.

FIG. 6 shows AFM phase image of graphene/alumina hybrid reinforced aluminum composite, showing laminated structure.

FIG. 7 shows Al/graphene composite produced by shear mix. a, A sketch of producing Al/graphene composite by shear mix method. Graphite flakes were shear mixed 10 min at 4500 rpm, and then aluminum powders were added gradually to get Al/graphene powders. b, High resolution TEM (HRTEM) and SAED pattern of graphene produced by shear mix method, showing nearly perfect crystal structure.

FIG. 8 shows SEM image and EDS maps of polished transverse section of graphene/alumina hybrid reinforced aluminum composite. a, Backscattered electron image. b, Corresponding EDS oxygen map. c, EDS carbon map.

FIG. 9 shows dark field TEM image of the graphene/alumina hybrid reinforced aluminum composite. a, Bright field image. b, Dark field image, brighter parts are alumina nanoparticles.

FIG. 10 shows SEM images and EDS maps of a peeled graphene/alumina hybrid reinforced aluminum composite layer. a, SEM image of the sample, showing nano asperities with round and rod-like morphologies. Pins indicate locations where point EDS analyses were carried out. b, Oxygen map and the range of oxygen content of five points. c, Carbon map and the range of carbon content of five points.

FIG. 11 shows scanning TEM (STEM) and atomic resolution EDS maps of the graphene/alumina hybrid reinforced aluminum composite. a, STEM image of graphene/alumina hybrid reinforced aluminum composite. b, Corresponding EDS map of (a), indicating that the interfaces were rich in oxygen and carbon. c, Close-up STEM image of the interface with three HRTEM images suggests that multilayered graphene embedded in $\alpha$-$Al_2O_3$ on the interface and beyond the interface was aluminum. d, EDS maps of aluminum e, oxygen f, carbon and g, overlapped map shows that a layer of carbon separated the aluminum layers and $Al_2O_3$ bands generated between carbon and aluminum.

FIG. 12 shows fast Fourier transform (FFT) patterns of HRTEM images in FIG. 11c. a, Aluminum matrix. b, $Al_2O_3$ nano asperities. c, Multilayered graphene FIG. 13 shows mechanical properties of graphene/alumina hybrid reinforced aluminum composite, Al/graphene mix, Al semi powder metallurgy, pure aluminum samples, and Al/graphene composite by shear mix samples. a, Comparative tensile test curves. b, Comparative bar chart of hardness, tensile strength, Young's modulus, and fracture toughness. c, Ashby plot of the specific values (that is, normalized by density) of strength and stiffness (or Young's modulus). d, Comparison of the strengthening and stiffening efficiencies of graphene/alumina hybrid reinforced aluminum composite with various reinforcements in Al matrix composites.

FIG. 14 shows nano indentation of graphene/alumina hybrid reinforced aluminum composite. a, The total depth-reduced modulus plot, showing an ordered oscillation of modulus. b, Schematic diagram of the nano indentation process.

FIG. 15 shows in-situ three-point bending test of a graphene/alumina hybrid reinforced aluminum composite sample in SEM. a, SEM images of the crack under various degrees of deformations. (Yellow arrows indicate the status of bending and white arrows indicate the primary crack propagation direction). b, The crack propagation of graphene/alumina hybrid reinforced aluminum composite sample exhibited a confluence of multiple toughening mechanisms. The primary crack was detoured into a serpentine morphology. Along with the primary crack, several large secondary cracks were stimulated and propagated parallel to the lamellae. The tip of the primary crack was blunt with large radius of curvature. The border of the primary crack displayed zig-zag shape with small secondary cracks. Metal bridges formed behind the crack tip. c, The crack propagation of an Al/graphene mix sample.

FIG. 16 shows graphene/alumina hybrid reinforced aluminum composite sample after high temperature heating. a, A piece of graphene/alumina hybrid reinforced composite was able to maintain the shape after heating at 750° C., while a piece of pure aluminum could not. b, After high temperature heating, laminated structures were preserved and nanoscale asperities became thicker. c, The sample has strength of 148.77 MPa after high temperature heating.

DETAILED DESCRIPTION

The present invention is described with reference to embodiments of the invention. Throughout the description of the invention reference is made to FIGS. 1-16. When referring to the figures, like structures and elements shown throughout are indicated with like reference numerals.

The following terms, used in the present description and the appended claims, have the following definition.

The term "flake" refers to a material having a small, flat, thin geometry.

The term "foam" refers to a substance that is formed by trapping pockets of gas in a solid.

The term "interface" refers to a region forming a common boundary between adjacent substances.

The term "nanoparticle" refers to a particle having a size between 1 and 100 nanometers.

FIG. 1(A) shows a flowchart of a fabrication process for graphene/metal-oxide hybrid reinforced metal composites in accordance with one embodiment of the present invention. According to this embodiment, the fabrication process includes a step 102 of forming a suspension comprising GO. At the forming step 102, in one embodiment, the suspension comprising GO may be produced through the Hummers method. Specifically, graphite powders are first mixed with sulfuric acid to form a slurry at 10° C. Subsequently, $KMnO_4$ is gradually added into the slurry with stirring. The graphite/acid/$KMnO_4$ mix is stirred 2 h at 10° C. and then heated to 40° C. In one embodiment, after the slurry is maintained at about 40° C. for about 12 hours, distilled water at 80° C. is added into the slurry. After the slurry is again maintained at 70° C. for about 2 hours, the slurry is diluted with distilled water and a solution of $H_2O_2$ is added to eliminate $KMnO_4$. After adding $H_2O_2$, a golden brown slurry is formed. The golden brown slurry is then centrifugally separated several times to obtain the suspension comprising GO without the acid. The concentration of GO in the suspension can be tuned by distilled water in a range of 0.1 to 10 mg/mL.

In one embodiment, functional groups attached on GO make GO hydrophilic and hence dispersible in an aqueous solvent without aggregation, forming brown aqueous suspension (FIG. 2). The as-obtained GO flakes are uniformly dispersed on HOPG (FIGS. 2a and 2b) and exhibited a height of about 0.8 nm under AFM (FIG. 2c). The thickness of graphene is about 0.35 nm. However, due to the existence of functional groups and defects, the thickness of single layer GO is about 0.8 nm. GO flakes are transparent and flexible as shown in FIG. 2d. Therefore, through the Hummers method, a large amount monolayer, high quality GO sheets are obtained.

Separately, the fabrication process includes a coating step 104. At the coating step 104, flakes may be coated with a layer of polymer to form surface treated flakes. The polymer may be a hydrophilic polymer such as PVA. The flakes may be aluminum flakes. In one embodiment, in order to enhance the bonding between aluminum flakes and GO sheets, 3 wt. % PVA solution is used to coat a hydrophilic layer on the surface of the aluminum flakes. Moreover, PVA solution also can be used as binder and morphology regulator during freeze dry process. The metal flakes may be composed of a metal selected from the group consisting of Al, Mg, Ti, Cu, Zn, Ni, Fe, Co and combination thereof.

After the forming step 102 and the coating step 104 are completed, the fabrication process continues to step 106 forming a slurry comprising graphene oxide and flakes.

At the forming step 106, the suspension comprising GO is mixed with the flakes while stirring to form a slurry comprising GO and flakes. In one embodiment, after stirring, the brown GO suspension becomes clear, indicating that GO sheets are coated onto the flakes. After the forming step 106 is completed, the fabrication process continues to freeze drying step 108.

At the freeze drying step 108, the slurry comprising GO and flakes may be filtered, then mixed with a PVA solution, and then lyophilized at −20° C. In one embodiment, the slurry may be then freeze dried for at least 12 hours, preferably 24 hours, to form a flake-GO foam. After the freeze drying step 108 is completed, the fabrication process continues to compressing step 110.

At the compressing step 110, the flake-GO foam may be mechanically compressed into a flake-GO dense foam. In one embodiment, the flake-GO foam may be compressed above 1 kN with a speed of crosshead speed of 10 mm/min. In another embodiment, the thickness of the flake-GO foam may be reduced 2 to 10 times, preferably 8 times, after compressing. After the compression step 110 is completed, the fabrication process continues to annealing step 112.

At the annealing step 112, the compressed flake-GO dense foam may be thermally heated to eliminate the PVA and reduce GO into graphene to form a flake-graphene dense foam. In one embodiment, the compressed flake-GO foam may be thermally heated at a temperature within a range of 500 to 600° C. in an argon atmosphere. After the annealing, the PVA layer evaporated leaving the aluminum flake surfaces tightly "glued" with a thin coating (FIG. 3a). The corresponding backscattered electron image and EDS map proved that this coating layer is carbon (FIGS. 3b and 3c). Without being held to a particular theory, we believe that the PVA treated surfaces with hydroxyl groups enabled a strong hydrogen-bonding interaction between Al and GO, resulting in the uniform adsorption of the graphene sheets onto the surface of the Al flakes. After the heating step 112 is completed, the fabrication process continues to sintering step 114.

At the sintering step 114, the flake-graphene dense foam is sintered. In one embodiment, the flake-graphene dense foam may be sintered at a temperature within a range from 630 to 660° C. with Ar protection for a time within a range from 1 to 3 h. After sintering, a bulk graphene/metal oxide hybrid reinforced composite is obtained. After the sintering step 114 is completed, the fabrication process continues to cold rolling step 116.

At the cold rolling step 116, the bulk graphene/metal oxide hybrid reinforced composite is cold rolled into a graphene/metal oxide hybrid reinforced composite. The graphene/metal oxide hybrid reinforced composite may be a plate. In one embodiment, the thickness of the bulk graphene/alumina hybrid reinforced aluminum composite is reduced 2 to 10 times, preferable 5 to 8 times, after cold rolling. In another embodiment, a very well arranged lamellar structure is created throughout the composite. Metal oxide nanoparticles are present at the interface between the graphene and the metal layers. Without being held to a particular theory, we believe that the formation mechanisms of the lamellar architecture for the graphene/alumina hybrid reinforced aluminum composite of this invention is as follows, as demonstrated in (FIG. 4). The PVA surface treatment creates a hydrophilic layer on the surface of the aluminum flakes, the GO sheets subsequently bond with them after mechanical stirring. During heat treatment, the GO sheets reduce to reduced GO and impede the aluminum flakes from melting together. Further, GO is the oxygen source responsible for stimulating the formation of $Al_2O_3$ nanoparticles. After the sintering process, severe plastic deformation makes the reduced GO sheets convert to defective graphene. Therefore at the interface regions, an $Al/Al_2O_3$/defective graphene/$Al_2O_3$/Al multi-layered morphology has been successfully fabricated. FIG. 1(B) illustrates a fabrication process for graphene/metal oxide hybrid reinforced aluminum composite.

Another example of the present invention is a graphene/metal-oxide hybrid reinforced composite. In one embodiment, the composite comprises graphene; metal; and metal oxide particles. The metal oxide particles may be metal oxide nanoparticles. The metal may be arranged in parallel lamellar structure to form metal layers. The graphene and the metal oxide nanoparticles are present between the metal layers. In another embodiment, the metal oxide nanoparticles are present at the interfaces between the metal layers and the graphene. In another embodiment, the composite comprises a band comprising the metal oxide nanoparticles at the interfaces between the metal layers and the graphene. The band may have a width of about 50 to 300 nm. In another embodiment, the composite comprises a sandwiched structure comprising graphene/the band comprising the metal oxide nanoparticles/metal in this order. In one embodiment, the metal oxide nanoparticles are nanoparticles of oxide of the metal. The metal may be selected from the group consisting of Al, Mg, Ti, Cu, Zn, Ni, Fe, Co and combination thereof. The metal is preferably aluminum. The metal oxide nanoparticles are preferably $Al_2O_3$ nanoparticles. The graphene may be present in an amount of 0.2 to 2 percent by weight based on total weight of the composite. The metal oxide nanoparticles may have a rod morphology. The graphene/metal oxide hybrid reinforced composite has a mechanical strength of 297 to 332 MPa, preferably of 300 to 320 MPa, and a toughness of 6350 to 7240 $KJ/m^3$, preferably of 7000 to 7240 $KJ/m^3$.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Hereinafter, the present invention will be described in more detail with reference to Examples. However, the scope of the present invention is not limited to the following examples.

EXAMPLES

All chemicals were purchased from Sigma-Aldrich Company without further purification.

Preparation of a Suspension Comprising Graphene Oxide (GO):

The GO suspension was prepared through the Hummers method. Specifically, 3 g of graphite powders with purity of 99.9% were added into 200 mL $H_2SO_4$ while being stirred vigorously. Subsequently, 30 g of $KMnO_4$ was gradually added into the slurry within 30 min and stirred at 10° C. for 2 h, the reaction was then continued at 40° C. for 12 h. Next, 200 mL of distilled water at 80° C. was added to the reacting product, and the reaction was allowed to continue at 70° C. for 2 h. 36 mL of 20% $H_2O_2$ was then added into the product to react with the remaining $KMnO_4$ turning the slurry golden brown in color. The slurry was centrifugally separated several times at 5000 rpm to get rid of the acid and ultra-sonicated for 2 h to obtain the GO suspension.

Fabrication of Graphene/Alumina Hybrid Reinforced Aluminum Composite:

Low cost aluminum flakes with purity ≥91% were used as raw materials (~100 μm in diameter and ~4 μm in thickness). The procedure of fabricating the graphene/alumina hybrid reinforced aluminum composite is illustrated as follows and sketched in FIG. 1(B):

a) 10 g of aluminum flakes were stirred in 50 mL of 3 wt. % PVA solution to coat a hydrophilic layer on their surface. The obtained slurry was then rinsed several times with distilled water.

b) Surface treated aluminum flakes were mixed with 40 mL of 5 mg/mL GO suspension and stirred 5 h to coat GO sheets on aluminum flakes. After stirring, the brown GO suspension became clear, indicating that GO sheets were coated onto aluminum flakes. The concentration of GO was 2 wt. %.

c) The obtained Al/GO hybrid flakes were filtered and then mixed with 5% PVA solution which used as binder and morphology regulator. After being frozen in a conventional refrigerator freezer, the mix was then freeze dried for 24 h to form Al/GO foam with a height around 30 mm.

d) The Al/GO foam was mechanically compressed to 3 mm at 1 kN with a speed of crosshead speed of 10 mm/min and afterwards thermally heated at 550° C. in an argon atmosphere to eliminate the PVA and reduce GO into graphene. Then the compact Al/graphene foam was further compressed under a load of 50 kN and subsequently sintered in an argon atmosphere at 655° C. for 2 h. Sintered samples were then cold rolled to 0.3 mm.

CONTROL EXAMPLES

For comparison, four control samples were fabricated. For the first control sample, a pure aluminum plate (99% purity) was purchased from ESPI Metal and cold rolled with the same thickness reduction/deformation rate as used for the graphene/alumina hybrid reinforced aluminum composite plates. For the second control sample, aluminum flakes were surface treated with PVA, compressed, freeze dried, and sintered without adding GO. The sample was compressed and cold rolled with the same thickness reduction/deformation rate as used for the graphene/alumina hybrid reinforced aluminum composite plates. The third control sample was fabricated using aluminum flakes without a PVA surface treatment step, that were then mixed with GO suspension directly and dried at 75° C. overnight and compressed and sintered without freeze drying, the obtained bulk material was cold rolled to 0.3 mm as well. For the fourth control sample, surface treated aluminum flakes were surface treated by PVA and shear mixed with graphite powders. The as-obtained slurry was freeze-dried, sintered, and rolled by the same procedure as described in FIG. 1(B). In this work, we term the first control sample pure aluminum, the second as Al semi powder metallurgy, the third sample is denoted as Al/graphene mix, and the four control sample is called Al/graphene composite by shear mix. Detailed processes and parameters are listed in Table 1.

TABLE 1

Sample notations and corresponding fabrication processes

| Processes Notations | Surface treatment | Mixing | Freeze dry | Compression | Annealing | Compression | Sintering | Cold rolling |
|---|---|---|---|---|---|---|---|---|
| graphene/alumina hybrid reinforced aluminum composite | PVA surface treatment | Stir with GO | 24 h | 1 kN | 550° C. 1 h | 50 kN | 655° C. 2 h | 80% reduction |
| Pure aluminum | | | | | | | | 80% reduction |
| Al semi powder metallurgy | PVA surface treatment | | 24 h | 1 kN | | 50 kN | 655° C. 2 h | 80% reduction |
| Al/graphene mix | | Stir with GO | | | 550° C. 1 h | 50 kN | 655° C. 2 h | 80% reduction |
| Al/graphene composite by shear mix | PVA surface treatment | Shear mix with graphite | 24 h | 1 kN | 550° C. 1 h | 50 kN | 655° C. 2 h | 80% reduction |

Testing Methods:

Tensile testing was carried out on an INSTRON MicroTester 5848 with an extension speed of 0.6 mm/min. Specimens for tensile tests were prepared according to ASTM standard E8. Hardness testing was performed on a Rockwell hardness tester with a load of 30 N and lasting time of 30 s. Microstructures of specimens were observed by FEI Quanta 650 SEM with EDS detector, JEOL 2000FX TEM, FEI TITAN G2 aberration corrected STEM/HRTEM. TEM specimens of cross sections were first cut by ultrathin Microtome, and then ion milled. STEM samples were prepared via focused ion beam (FIB) with thickness of 20 nm. Nano indentation tests were carried out on a nanoindentation instrument from Micro Materials. 100 cycles of partial loading-unloading testing was done from 15 to 25 mN with an increment of 0.1 mN. The tip was a diamond Berkovich tip whose shape function was carefully calibrated.

Results

A fracture surface of the obtained graphene/alumina hybrid reinforced aluminum composite is shown in FIG. 5a. A very well arranged brick-and-mortar-like structure was successfully created throughout the composite. AFM phase diagram image in FIG. 6 further corroborated the presence of laminated structure. Nanoscale asperities were found on the aluminum flake surfaces and metallic bridges (blue arrow) connected layers (FIG. 5a).

The fracture surface of the pure aluminum plate after severe plastic deformation showed a pyramidal shape with two flat faces at 450 against the rolling direction, a typical ductile metal fracture surface (FIG. 5b). Dimples were distributed on the fracture surface of the Al semi powder metallurgy sample (without GO) (FIG. 5c), the existence of which proved the formation of micro-voids, indicating the impurity of the raw materials and that the powder metallurgy processes induced second phase particles and defects into the aluminum matrix. The Al/graphene mix sample (without PVA surface treatment and freeze dry process), on the other hand, had a clear evidence of aggregation of nano asperities (FIG. 5d). There were some visible defects on the fracture surface, which were introduced by graphene during the mixture. Accordingly, no orderly lamellar architectures were formed in any of these control samples. In the last control sample, nearly perfect graphene crystals were produced by the shear mixing method (FIG. 7). Through the shear mixing, graphene sheets were well coated on the aluminum flakes. FIG. 5e shows that the Al/graphene composite by shear mix also possessed a laminated structure, but without nanoasperities comprising to graphene/alumina hybrid reinforced aluminum composite in FIG. 5a.

The cross-sectional TEM image (FIG. 5f) revealed that a nano particle band existed between two aluminum layers (FIG. 5f). The close-up TEM image indicated that the nanoscale asperities were in fact numerous particles with quasi-rectangular shape (FIG. 5g) and a bright boundary existed between nano particles. Statistics of particle sizes are shown in Table 2, indicating that these particles were more like rods in shape than cubes or spheres. Since the morphology of reduced GO is close to graphene, which is a flat thin film, these particles cannot be graphene sheets. SAED pattern of nanoscale asperities uncovered that these particles were actually aluminum oxide ($Al_2O_3$) (FIG. 5h). Backscattered electron imaging and the corresponding EDS map (FIG. 8) suggest that oxygen was only rich at the lamellar interfaces. Dark field TEM image (FIG. 9) validated aforementioned results. The average thickness of aluminum layers calculated from SEM, TEM and AFM results is 1.05 µm and that of the $Al_2O_3$ nanoparticle bands is about 150 nm.

Compared with the spontaneously formed amorphous $Al_2O_3$ layer in Li, Z. et al (Li, Z. et al, Nano Lett. 15, 8077), this $Al_2O_3$ particle band is thicker and crystalline. SEM images of peeled aluminum surfaces (FIGS. 5i and 10) verified that $Al_2O_3$ nanoparticles had rod-like morphologies. The EDS maps justified that the surface was covered by a carbon layer (FIG. 10c). In comparison, Al/graphene composites produced by shear mix method did not have any nano asperities on the surface (FIG. 5j).

TABLE 2

Statistical size of $Al_2O_3$ particles
Sizes of nano $Al_2O_3$ particles (nm)*

| Maximum length | Minimum length | Average length |
|---|---|---|
| 148 | 21 | 62 |
| Maximum width | Minimum width | Average width |
| 30 | 22 | 25 |

*The shape of the nano particles was taken to be rectangular.

Low magnification STEM imaging and the corresponding EDS map (FIGS. 11a and 11b) demonstrated similar results to the SEM image and EDS map in FIGS. 10a and 10b: only lamellar interfaces were found to be rich in oxygen. A close-up observation of the interface area and atomic resolution EDS maps of aluminum, oxygen, carbon, and a combined map are shown in FIG. 11a-11g. A carbon film with thickness ranging from 5 to 13 nm was clearly embedded in the $Al_2O_3$ band, separating the aluminum lamellae and forming aluminum/$Al_2O_3$/graphene sandwich structure. The HRTEM images (FIG. 11c) and corresponding FFT patterns (FIG. 12) solidly validated that the bright line in TEM images and the dark interface in STEM images was multilayered graphene. Unlike the aluminum and $Al_2O_3$ crystals, which processed a nearly perfect lattice structure, the multilayered graphene displaced discontinuous and tortuous pattern, indicating the existence of defects. The thickness of monolayer graphene is 0.38 nm, therefore this carbon film is equivalent to 13 to 34 layers of 2D atoms. The HRTEM image and FFT pattern also verified the $Al_2O_3$ particles were $\alpha$-$Al_2O_3$. Since the crystal structure of $\alpha$-$Al_2O_3$ is HCP, it thermodynamically tends to grow along the close packed <0001> direction, leading to rod-like morphology displayed in FIGS. 5g and 5i. Unlike aluminum and oxygen that overlapped on a large scale, carbon was concentrated at the middle of the gap, indicating that only a few Al/C components formed in this composite (differing from the findings of others). Based on element maps and dark field images in FIG. 11 and FIG. 9 respectively, the approximate volume fraction of $Al_2O_3$ phase is 28.1% and that of graphene bands is 5.2%.

Mechanical Properties

The graphene/alumina hybrid reinforced aluminum composite exhibited superiority in mechanical properties across the board (FIG. 13). Tensile test samples were machined to a dog-bone shape according to ASTM standard. Comparing with the other four control samples, the tensile strength, yield strength, and Young's modulus of the graphene/alumina hybrid reinforced aluminum composite were far superior (FIG. 13a). Although the composite is not as ductile as pure aluminum, the tensile curve still exhibits a typical R-curve morphology, indicating evident plastic deformation. A moderate increase in elastic modulus and strength in the Al/graphene mix sample and Al semi powder metallurgy sample was due to impurities and defects, which also made these samples brittle. Since pores and defects were also found in graphene/alumina hybrid reinforced aluminum composites (FIG. 8), the laminated design is considered to be less defect-sensitive. Although the Al/graphene composite by shear mix also exhibited excellent improvements in strength and elastic modulus over aluminum, it was still outperformed by the graphene/alumina hybrid reinforced aluminum composite by freeze-dry powder metallurgy in all categories. For 9 tensile samples taken from three separately prepared batches of the Al/graphene composite, the ultimate strength ranged from 303 MPa to 332 MPa with a mean value of 308 MPa, with the final strain at fracture ranging from 2.4% to 3.3% with an average value of 2.8%. Values of ultimate strength and strain are not linearly related; samples that have higher ultimate strengths may also be more ductile. Quantitatively, for the five specimens showed in FIG. 13a, the graphene/alumina hybrid reinforced aluminum composite exhibits a 210% improvement in hardness, a 223% improvement in ultimate strength, a 78% improvement in Young's modulus and a 30% improvement in toughness compare with pure aluminum. Compared with the other three control groups the graphene/alumina hybrid reinforced aluminum composite also showed clear improvement in every mechanical property, especially in toughness (detailed numbers are listed in Table 3).

TABLE 3

Mechanical properties of graphene/alumina hybrid reinforced aluminum composite and other four control specimens

| Sample | Strength (MPa) | Hardness (HV) | Young's Modulus (GPa) | Toughness (kJ/m$^3$) |
|---|---|---|---|---|
| graphene/alumina hybrid reinforced aluminum composite | 308.12 | 93 | 123.34 | 7227 |
| Pure aluminum | 94.75 | 30 | 69.87 | 5615 |
| Al semi powder metallurgy | 148.93 | 46 | 92.66 | 5075 |
| Al/graphene mix | 163.76 | 60 | 112.53 | 2646 |
| Al/graphene composite by shear mix | 221.37 | 67 | 99.15 | 5830 |

The improvement of mechanical properties of the composite (graphene/alumina hybrid reinforced aluminum composite) over the matrix material (Al) exceeds all previous works. The ultimate tensile strength is also comparable to that of AA6061-T6 alloy. FIG. 13c shows the Ashby plot of the specific strength and stiffness (normalized by density) of different materials. The graphene/alumina hybrid reinforced aluminum composite outperforms most metals and alloys and located at the top of composites. The reinforcing efficiency in a metal matrix composite can be defined as the strength and modulus increment per unit volume fraction of the reinforcement, i.e., $(\sigma_c-\sigma_m)/V_f\sigma_m$ and $(E_c-E_m)/V_fE_m$, where $\sigma_c$ and $\sigma_m$ are the tensile strengths of the composite and the matrix, respectively, $E_c$ and $E_m$ are the Young's modulus of the composite and the matrix, respectively, and $V_f$ is the volume fraction of the reinforcement. For aluminum based composites, our graphene/alumina hybrid reinforced aluminum composite processes outstanding strengthening efficiency and stiffening efficiency which exceeds most reported composites (FIG. 13d).

Partial loading-unloading nano indentation with an increment of 0.1 mN was carried out. With the increase of total indentation depth the corresponding reduced modulus exhibited an orderly wave-like morphology (FIG. 14a) oscillating from a peak value of 93 GPa to a minimum value of about 73 GPa. Since the maximum depth of a single cycle was approximately 800 nm and the average thickness of the aluminum layers was 1.05 µm, it is highly likely that the indenter simply contacted the aluminum in one cycle and penetrated into the $Al_2O_3$/carbon/$Al_2O_3$ layer in the subsequent cycle, leading to an ordered oscillation of reduced modulus (FIG. 14b). This result mechanically justified the hard-soft-hard architecture.

According to densities of individual constituents of the graphene/alumina hybrid reinforced aluminum composite (Al 2.7 g/cm$^3$, graphene 2.25 g/cm$^3$, α-$Al_2O_3$ 3.98 g/cm$^3$) the theoretical density of Al/2 wt. % graphene composites should be higher than pure aluminum, consistent with the work of M. Rashad et al [Rashad, M., Pan, F., Tang, A. & Asif, M., Prog. Nat. Sci. Mater. Int. 24, 101-108 (2012)]. However, the density of as-obtained graphene/alumina hybrid reinforced aluminum composite was approximately 2.6 g/cm$^3$. Even after severe mechanical deformation (over 95%) and high temperature sintering (655° C.), the density was still lower than that of pure aluminum. The low density can be attributed to the incompact structure of nano asperities shown in FIG. 5 and the pores of trapped gas left in the matrix after sintering shown in FIG. 8a. Therefore, the obtained composite is not a fully densified bulk material.

Without being held to a particular theory, we believe that the superior mechanical performance of our graphene/alumina hybrid reinforced aluminum composite stems from the synergic contribution of multiple features. Pristine monolayer graphene exhibits extremely high strength and stiffness. However, past literature has found the Young's modulus of monolayer graphene decreases abruptly from 1 TPa to 223.9 GPa after oxidization. Although the modulus would improve after reduction, defects will deteriorate mechanical properties further. Moreover, the thickness of the carbon layer is equivalent to 13 to 34 layers of graphene, which decreases the mechanical performance of graphene to a large extent. Therefore, the real Young's modulus of the graphene layer in the composite should be less than 200 GPa. Although multi-layer defective graphene flakes may still be able to strengthen MMCs, the real effect is much less than expected (Al/graphene mix by shear mix sample). Here, the graphene/alumina hybrid reinforced aluminum composite by freeze-dry powder metallurgy sample gave much better mechanical results than the Al/graphene composite by shear mix sample. Clearly, the difference in mechanical properties originates from $Al_2O_3$ nano asperities, which possesses an elastic modulus of 400 GPa and a strength of 3 GPa. In the graphene/alumina hybrid reinforced aluminum composite sample, the $Al_2O_3$/graphene/$Al_2O_3$ sandwiched band plays the same role as $CaCO_3$ particles in nacre, jointly serving as the primary load bearer for greater strength. These hybrid bands also confine the immigration of grain boundaries and prevent recrystallization during high temperature heating. $Al_2O_3$ nano particles, on the other hand, are able to pin the dislocations by Orowan mechanism. Besides, large interfacial area stimulates the pile-up of dislocations, improving the dislocation density very quick, leading to a high strain hardening rate. The aforementioned microscale mechanisms jointly strengthened and stiffened the composite.

Without being held to a particular theory, we believe that we also cannot ignore the toughening mechanisms from the unique laminated design. Ritchie and his co-workers [Ritchie, R. O., Nat. Mater. 10, 817-822] have worked extensively on the toughening mechanisms of layered biological structures and concluded that, unlike monolithic materials such as aluminum alloys, toughness in these materials often comes from extrinsic mechanisms (behind the crack tip, >1 μm) including crack deflection, bridging, and microcracking. Related bio-inspired materials also showed similar toughening mechanisms. In order to validate the fracture process of our graphene/alumina hybrid reinforced aluminum composite sample, in situ three-point bending test of an graphene/alumina hybrid reinforced aluminum composite sample were carried out under SEM (FIG. 15a) to monitor the evolution of cracks. The crack propagation of graphene/alumina hybrid reinforced aluminum composite sample exhibited a confluence of multiple biological toughening mechanisms (FIG. 15b).

The primary crack was detoured into a serpentine morphology instead of a Mode I (opening) orientation. Along with the primary crack, several large secondary cracks were stimulated and propagated parallel to the plate. Moreover, the border of the primary crack displayed a zig-zag shape with small secondary cracks. All of these mechanisms inherently elongated the crack path, leading to more energy required to propagate the crack, $W_s$:

$$W_s = 2ab\gamma \quad (1)$$

Where a is the crack length, b is the out-of-plane thickness of the solid material, and γ is the sum of surface energy ($\gamma_s$) and energy related to plastic deformation ($\gamma_p$). The crack length in FIG. 15a② was measured carefully by pixels. The span between the crack tip and plate surface was 164.11 μm, but the total crack length was an amazing 512.89 μm. For comparison, an identical experiment was also done with the Al/graphene mix sample with the same size and shape. FIG. 15c shows the crack morphology of the Al/graphene mix sample with the same bending deformation as FIG. 15a①. Clearly, the crack went straight from one side of the plate to the other side without deflections. The span from the plate surface to the tip of the crack in this sample was 160.61 μm and the total length of the crack was 227.15 μm. Since both of the two samples are comprised of aluminum and GO, we can assume the values of energy γ are almost the same. Substituting all the numbers into equation (1), the work required to propagate a crack for graphene/alumina hybrid reinforced aluminum composite sample is 2.21 times higher than that of the Al/graphene mix sample. This result is consistent with the fracture toughness calculated from tensile test curves (FIG. 13).

Comparing the images of the crack tips for the two samples, the crack tip of the graphene/alumina hybrid reinforced aluminum composite sample has a much larger radius of curvature (ρ) (1.47 μm) than that of Al/graphene shear mix sample (0.20 μm). Without being held to a particular theory, we believe that this is because in the graphene/alumina hybrid reinforced aluminum composite sample the aluminum layers are perpendicular to the crack propagation direction, hence the crack has to "breakdown" the aluminum layers. However, for the Al/graphene mix sample, the crack can easily propagate through defects, which should be caused by the non-homogeneously dispersed graphene and $Al_2O_3$ particles. The crack tip opening distance (CTOD) can be calculated as:

$$CTOD = \frac{K^2}{\sigma_a E} \quad (2)$$

Where K is a stress field parameter that represents the local stress concentration, $\sigma_a$ is the applied stress, and E is the Young's modulus. Since aluminum has a higher K and lower E compared with $Al_2O_3$ and graphene, it is reasonable for the graphene/alumina hybrid reinforced aluminum composite to have a larger CTOD. Without being held to a particular theory, we believe that another reason is that in this composite structure with soft layers (aluminum) embedded within hard layers ($Al_2O_3$/graphene/$Al_2O_3$), as the crack reaches a weak interface, the stress on the crack can easily break the interface forming a perpendicular crack ahead of the crack tip. When these cracks merge the crack tip radius of curvature will significantly increase, this is called the Cook-Gordon toughening mechanism. The radius curvature is inversely related with the stress on the crack tip[54]:

$$\sigma_{tip} = \sigma_a \left(1 + 2\sqrt{\frac{a}{\rho}}\right) \quad (3)$$

Here, a is the pre-existing crack or void length. Thus, obviously, the stress concentration on the crack tip of the graphene/alumina hybrid reinforced aluminum composite sample is much lower than that of the Al/graphene mix sample, which also explains why the crack in the Al/graphene mix sample propagated more quickly under the same degree of deformation.

Without being held to a particular theory, we believe that two other toughening mechanisms are the nano roughness and the metal bridges behind the crack tip. Delamination because of weak connections between different layers may cause quick fracturing in laminated materials. Close observation of the fracture surface of the graphene/alumina hybrid reinforced aluminum composite sample showed rare evidence of "pull out" between layers because the roughness provided by the asperities also interlocked the lamellae preventing large-scale delamination. Metal bridges behind the crack tip impeded the opening of the crack, further impeding its progress.

According to past research, the fracture toughness density of $Al_2O_3$ is about 255 kJ/m³ and defective graphene is 223 kJ/m³ (maximum). A simple superposition of these values with the fracture toughness of pure aluminum is 6133 kJ/m³, which is 18% lower than the fracture toughness of the graphene/alumina hybrid reinforced aluminum composite. Thus, via the cooperation of multiple phases and the unique features of the laminated structure, the toughness value of the composite exceeds those of their constituents and their homogeneous mixtures.

The graphene/alumina hybrid reinforced aluminum composite also exhibited a superior resistance to high temperature comparing with pure aluminum. A sheet of graphene/alumina hybrid reinforced aluminum composite sheet and a sheet of pure aluminum with the same dimensions were heated to 750° C. for 1 h (much higher than the melting point of aluminum, 660° C.). The graphene/alumina hybrid reinforced aluminum composite sheet remained the same as it was in terms of shape and size, whereas the pure aluminum piece was melted into an irregular shape bar (FIG. 16a). Further experiments showed that graphene/alumina hybrid reinforced aluminum composite could maintain their size and shape up to temperatures on the order of 900° C.

Without being held to a particular theory, we believe that this is due to the encapsulation of the aluminum flakes in the composite by an $Al_2O_3$ and graphene shell, both of which have much higher melting points than pure aluminum. During high temperature heating this shell surrounded the aluminum core allowing the material to retain its shape and size even when the aluminum core melted. After the 750° C. heat treatment the graphene/alumina hybrid reinforced aluminum composite remained in a lamellar orientation, but the nanoscale asperities became thicker, coarser and less uniform (FIG. 16b). Mechanical testing showed that the 750° C. treated graphene/alumina hybrid reinforced aluminum composite sheet had a high strength of 148 MPa with an elongation of 4.1% (FIG. 16c).

What is claimed is:

1. A process for forming a graphene/metal-oxide hybrid reinforced composite, comprising:
    freeze drying a slurry comprising graphene oxide and flakes to form a flake-graphene oxide foam;
    compressing the flake-graphene oxide foam to form a flake-graphene oxide dense foam;
    annealing the flake-graphene oxide dense foam to form a flake-graphene dense foam;
    sintering the flake-graphene dense foam to form a bulk graphene/metal-oxide hybrid reinforced composite; and
    cold rolling the bulk graphene/metal-oxide hybrid reinforced composite to form the graphene/metal-oxide hybrid reinforced composite.

2. The process for forming a graphene/metal-oxide hybrid reinforced composite according to claim 1, wherein the flakes are metal flakes.

3. The process for forming a graphene/metal-oxide hybrid reinforced composite according to claim 1, wherein the flakes are coated with a layer of polymer.

4. The process for forming a graphene/metal-oxide hybrid reinforced composite according to claim 1, wherein the slurry comprising graphene oxide and flakes is formed by a method comprising:
    forming a suspension comprising graphene oxide; and
    mixing the suspension comprising graphene oxide with flakes.

5. A process for forming a graphene/metal-oxide hybrid reinforced composite, comprising:
    freeze drying a slurry comprising graphene oxide and flakes to form a flake-graphene oxide foam, wherein the flakes are ceramic flakes.

6. A graphene/metal-oxide hybrid reinforced composite, comprising
    a) graphene;
    b) metal; and
    c) metal oxide particles;
    wherein the graphene is present in an amount of 0.1 to 5 percent by weight based on total weight of the composite.

7. The graphene/metal-oxide hybrid reinforced composite according to claim 6, wherein the metal oxide particles are metal oxide nanoparticles.

8. The graphene/metal-oxide hybrid reinforced composite according to claim 6, wherein the metal is arranged in parallel lamellar structure to form metal layers.

9. The graphene/metal-oxide hybrid reinforced composite according to claim 8, wherein the graphene and the metal oxide nanoparticles are present between the metal layers.

10. The graphene/metal-oxide hybrid reinforced composite according to claim 8, wherein the metal oxide nanoparticles are present at the interfaces between the metal layers and the graphene.

11. The graphene/metal-oxide hybrid reinforced composite according to claim 8, wherein the composite comprises a band comprising the metal oxide nanoparticles at the interfaces between the metal layers and the graphene.

12. The graphene/metal-oxide hybrid reinforced composite according to claim 11, wherein the composite comprises a sandwiched structure comprising the graphene/the band comprising the metal oxide nanoparticles/the metal in this order.

13. The graphene/metal-oxide hybrid reinforced composite according to claim 7, wherein the metal oxide nanoparticles are nanoparticles of oxide of the metal in b).

14. The graphene/metal-oxide hybrid reinforced composite according to claim 6, wherein the metal is selected from the group consisting of Al, Mg, Ti, Cu, Zn, Ni, Fe, Co and combination thereof.

15. The graphene/metal-oxide hybrid reinforced composite according to claim 6, wherein the metal is aluminum.

16. The graphene/metal-oxide hybrid reinforced composite according to claim 7, wherein the metal oxide nanoparticles have a rod morphology.

17. The graphene/metal-oxide hybrid reinforced composite according to claim 6, wherein the graphene/metal-oxide hybrid reinforced composite has a mechanical strength of 240 to 1550 MPa and a toughness of 4500 to 12000 KJ/m$^3$.

18. A graphene/metal-oxide hybrid reinforced composite, comprising:
    a) graphene;
    b) metal; and
    c) metal oxide particles;
    wherein the metal oxide particles are metal oxide nanoparticles, and
    wherein the metal oxide nanoparticles are $Al_2O_3$ nanoparticles.

* * * * *